April 30, 1929.     E. D. PUTT     1,711,473
TIRE FINISHING MACHINE
Filed April 29, 1925    4 Sheets-Sheet 3

INVENTOR.
EDWARD D. PUTT.
BY
G. L. Ely
ATTORNEY.

INVENTOR.
EDWARD D. PUTT.

Patented Apr. 30, 1929.

1,711,473

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

TIRE-FINISHING MACHINE.

Application filed April 29, 1925. Serial No. 26,652.

This invention relates to tire finishing machines and particularly to machines for finishing tires of large section such as balloon tires after they have been removed from the cores on which they are built.

One object of the invention is to provide means for readily receiving and supporting the tire and to drive it circumferentially while the various finishing elements, including the side wall and chafer strips, are progressively applied to the side walls and about the beads of the tire by devices arranged to act upon the driven tire.

Another object of the invention is to provide means for supporting the tire remote from the applying devices by engagement with the under side of the upper bead to insure the proper rotation of the tire with respect to the applying devices and adapted to be easily engaged with, or disengaged from tires of large section and small bead diameter such as balloon tires.

Another object is to provide an improved pressure stitcher for shaping the elements on the side-wall of a tire.

The foregoing and ancillary objects are obtained by the construction illustrated in the accompanying drawings and described below. The invention is not limited to the specific construction shown and described.

Of the accompanying drawings;

Figure 7 is a plan and Figure 8 is a section through a portion of the side wall strip; and Figures 9 and 10 are respectively a plan and a section through a portion of the composite chafer strip.

Figure 1:
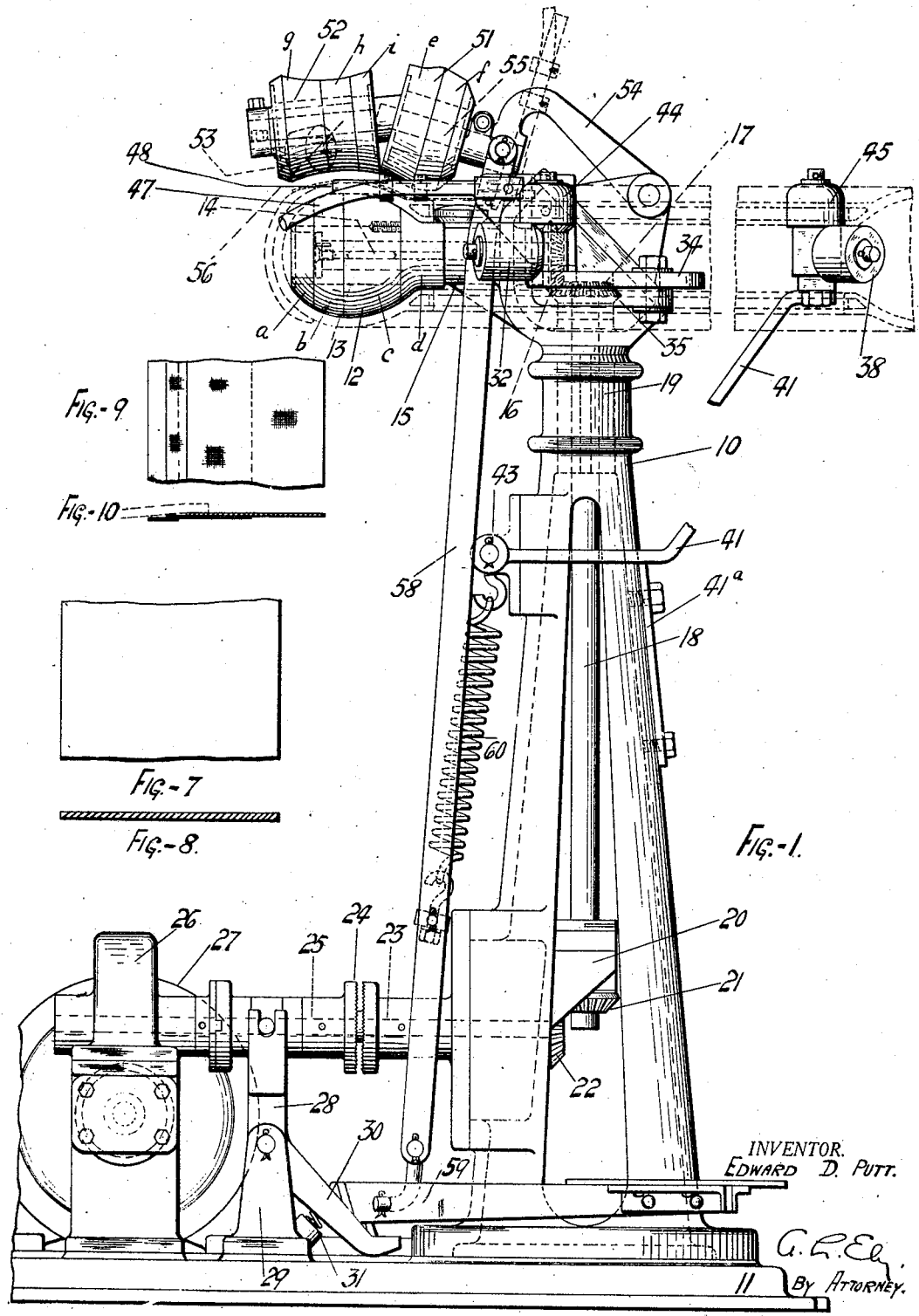
Figure 1 is a front elevation of a device embodying the invention.

Referring to the drawings, 10 represents a suitable standard mounted on a base plate 11 and having journaled on its upper end a tire-supporting and driving roller 12 formed in sections $a$, $b$, $c$ and $d$, of which $a$, $b$ and $d$ are journaled on a shaft 13 and $c$ is secured on said shaft by means of a key 14. Shaft 13 is journaled at 15 on standard 10 and has on its right end a bevel gear 16 meshed with a bevel gear 17 on the top end of a vertical shaft 18 journaled in standard 10 at 19 and 20 and provided with a bevel gear 21 on its lower end. Meshed with bevel gear 21 is a bevel gear 22 secured on a shaft 23 arranged to be driven through a clutch 24 by a shaft 25 driven through a reduction 26 by means of a motor 27. For operating clutch 24 a yoke 28 is employed which is pivoted on a bracket 29 on base plate 11 and has an arm 30 connected thereto and normally holding the clutch disengaged by action of a spring 31 seated on base plate 11 and urging arm 30 upwardly.

Roller 12 is adapted to receive a tire in the manner indicated by the dotted lines in the various figures. In order to support the tire to be circumferentially driven by roller 12 in a horizontal plane, roller 32 is arranged in front of roller 12 and a roller 33 to the rear thereof, both of said rollers being arranged to engage under the upper bead of the tire. Roller 32 is carried by an arm 34 longitudinally adjustable on an arm 35 secured on standard 10. Roller 33 is carried by a bracket 36 secured on standard 10. To support the tire at points remote from roller 12 so that its upper side wall will be accurately driven in a horizontal plane, rollers 37 and 38 are provided, these rollers being arranged to engage under the upper bead of the tire and being carried by a bar 39 adjustable toward or from roller 14 on a pair of arms 40 and 41 extending downwardly from the plane of the tire and pivoted at 42 and 43 on standard 10 so that arms 40 and 41 can be swung inwardly of the tire toward roller 12 to facilitate mounting a tire in or removing it from the machine. The arms 40 and 41 are maintained normally in the positions shown by stops indicated at 41$^a$ on standard 10.

For centering the tire to carry it past the various stitching devices in proper relation, a roller 15$^a$ is mounted on journal 15 to engage the inner periphery of the bead, a roller 44 is journaled on arm 34 so as to engage the inner periphery of the upper bead, a roller 45 is journaled on one end of bar 39, also to engage the inner periphery of the upper bead, and a roller 46 is journaled on the other end of bar 39 also to engage the inner periphery of the upper bead.

Figure 2:
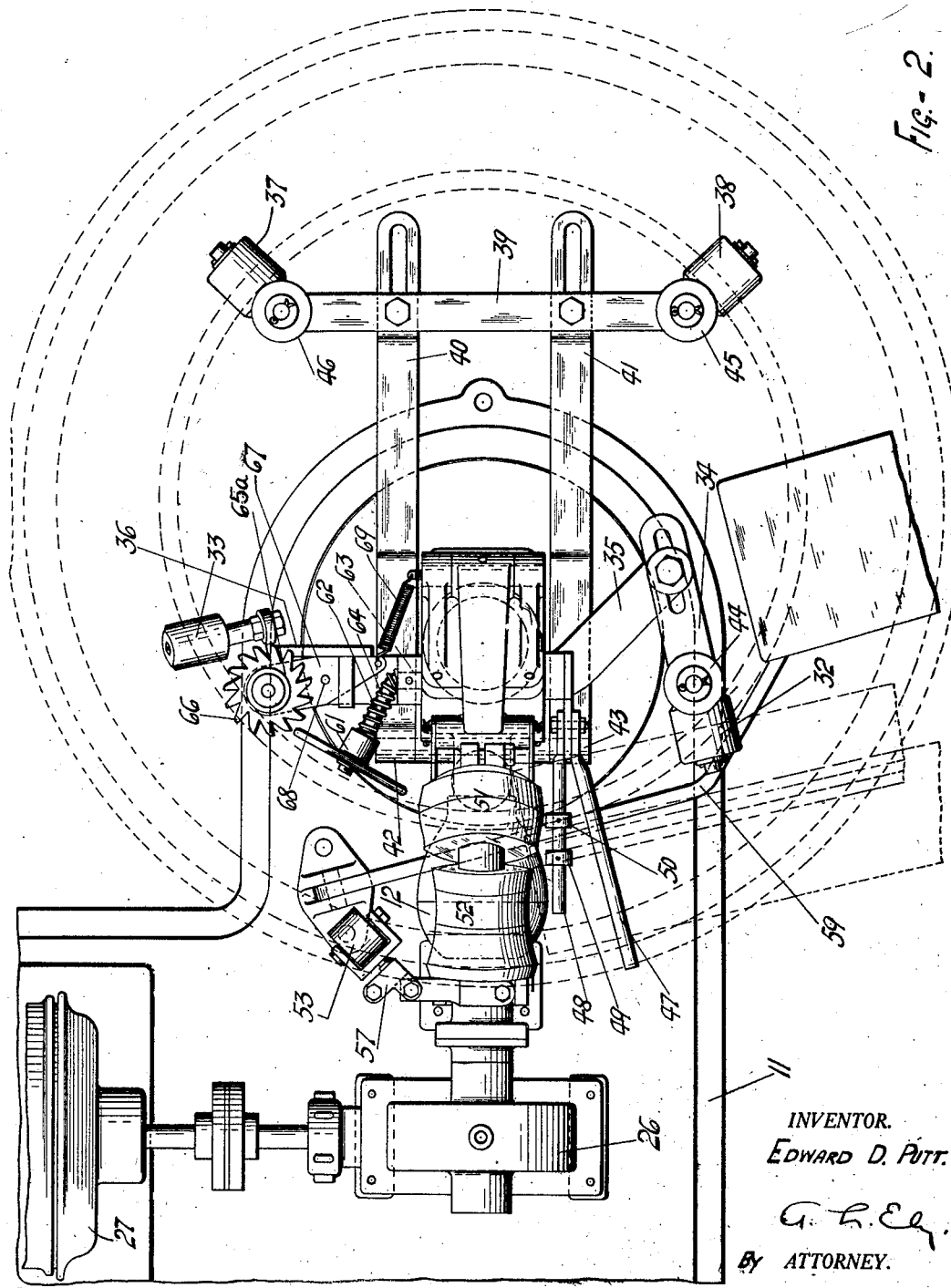
Figure 2 is a plan thereof.
Figure 3:
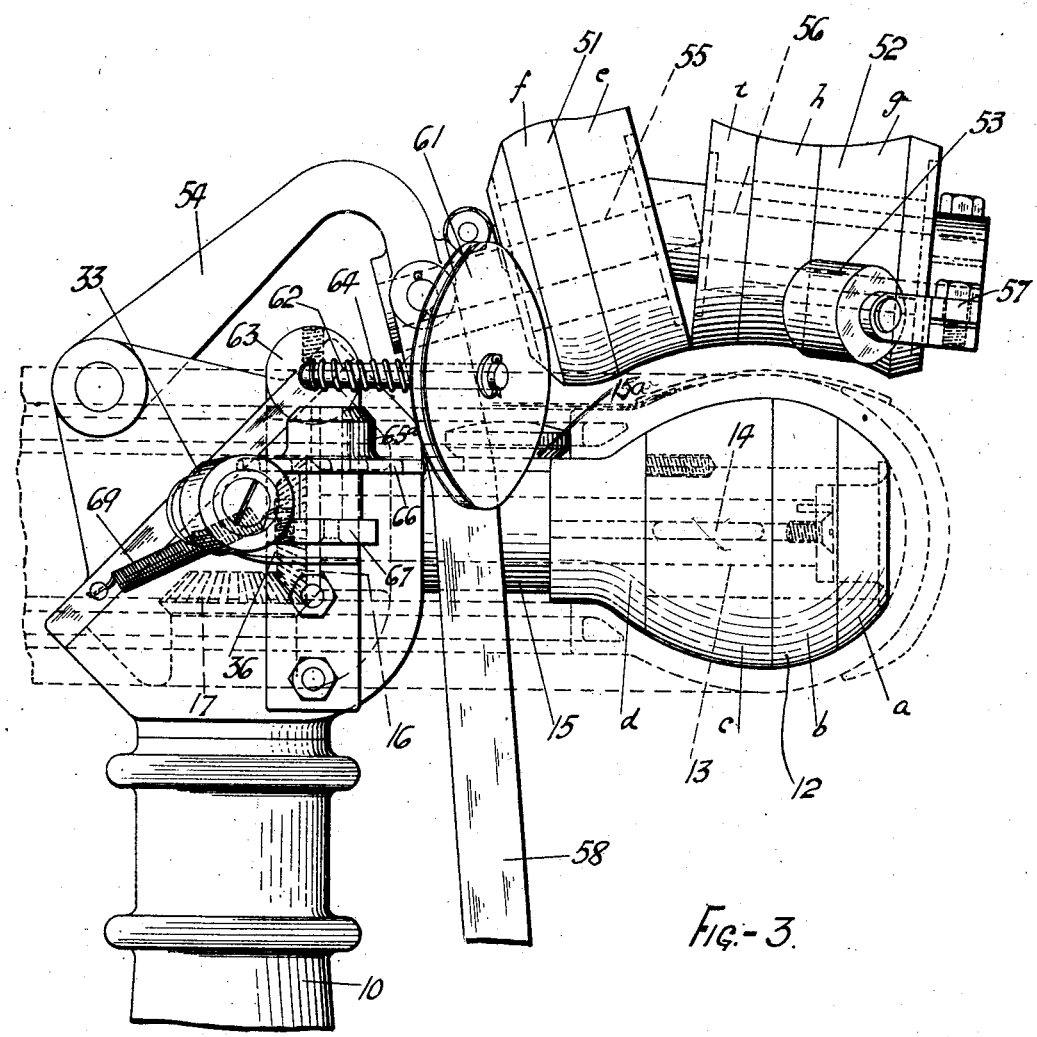
Figure 3 is an enlarged rear elevation of a portion thereof.
Figure 4:
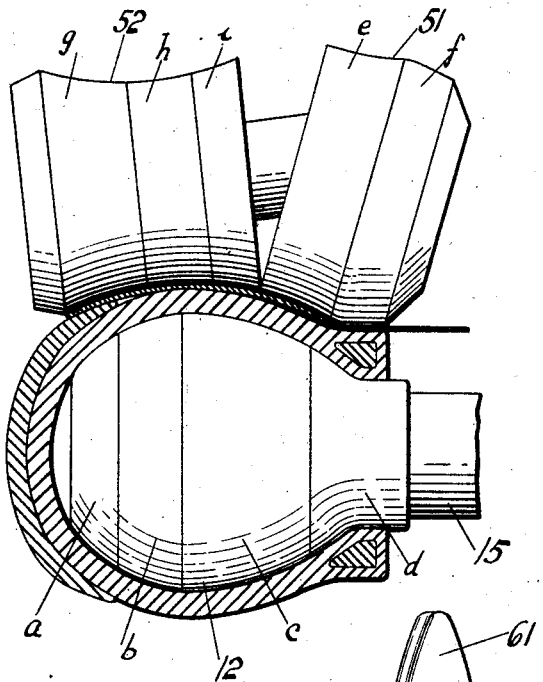
Figures 4, 5 and 6 illustrate the progressive action of the various devices in applying the finishing elements, showing respectively the first, third and fourth operations required to stitch the elements in place.

Arranged to feed the finishing elements onto the tire in the machine guides 47 and 48 are employed. Guide 47 is pivoted on standard 10 to swing to the position best shown in Figure 2 whereby the operative may pass the finishing strips thereover and tension them thereon. Guide 48 is pivoted on frame 10 so as to rest on the strips passing from over the guide 47 onto roller 46 and is provided with adjustable collars 49 and 50 respectively to engage an edge of the chafer strip and to engage an edge of the side wall strip to properly guide them onto the tire.

Driving of the tire and the first two stitching operations are accomplished by means of stitcher rollers 51, 52 and 53 which are movable against the tire on roller 12 and are carried by a pivoted arm 54 mounted on the top of standard 10. Roller 51 includes sections e and f so formed and journaled on a spindle 55 so directed as to cause said roller to engage on the bead and inner portion of the side wall of the tire. Roller 52 includes sections g, h and i so formed and journaled on a spindle 56 so directed as to cause said roller to engage on the outer portion of the side wall. Roller 53 is carried by a swivel bracket 57 on spindle 56 so as to stitch the edge of the side wall where it joins with the tread after the action of roller 52 on the side wall. Rollers 51 and 52 in combination are of a profile of the contour of the side of the tire from bead to tread. For moving the rollers 51, 52 and 53 onto the tire and simultaneously driving roller 12 to rotate the tire, a link 58 is connected to arm 54 and to a pedal lever 59 arranged to be depressed into engagement with and to thus depress arm 30 to engage clutch 24. Arranged to normally hold the rollers 51, 52 and 53 elevated and the pedal 59 out of engagement with arm 30 is a tensile spring 60 connected to link 58 and to standard 10.

Figure 5:
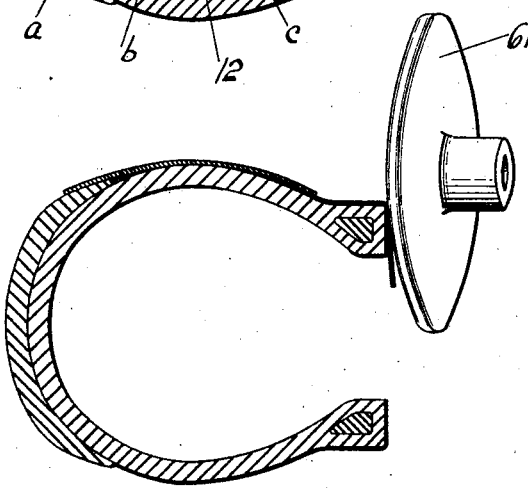

The third operation of turning the chafer downwardly onto the inner periphery of the bead (Figure 5) is accomplished by the following device. A stitcher disk 61 is journaled on a spindle 62 pivotally adjustable on standard 10 at 63 and having a spring 64 thereon, urging the disk 61 outwardly against the inner periphery of the bead whereby the inwardly projecting chafer will be wiped downwardly about the bead by disk 61.

Figure 6:
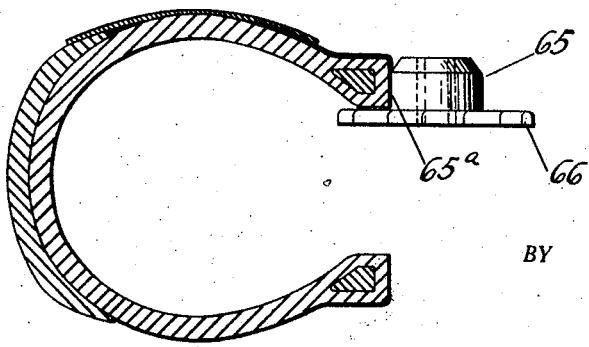

The fourth operation of turning the chafer in under the bead and at the same time stitching it into place on the periphery of the bead (Figure 6) may be effected by a star wheel 65 formed with a cylindrical portion 65ª for stitching against the inner periphery of the bead and the teeth 66, 66 extending in under the bead for wiping the chafer in under the bead and securing it against the inner surface of the tire. Wheel 65 is journaled on a lever 67 pivoted at 68 on bracket 36 and having a tensile spring 69 connected to its other end and to standard 10 so as to urge wheel 64 against the bead of the tire.

It will clearly appear from the foregoing that the ends of the finishing strips are first properly attached to the tire, pedal 59 is then depressed and the tire thus driven, the various stitching operations taking place progressively until applied entirely about the tire whereupon the strips are cut to the proper length and the ends stitched into place on the tire.

The mounting of a tire in the machine is accomplished by first engaging it over roller 12 and holding the right portion thereof upwardly while swinging arms 40 and 41 inwardly (to the left) of the tire, then dropping the right side of the tire to position it in a horizontal plane on rollers 32 and 33 and against roller 44 and at the same time permitting arms 40 and 41 to swing outwardly until rollers 37 and 38 pass under the upper bead and rollers 45 and 46 engage the inner periphery thereof whereupon the arms 40 and 41 are permitted to drop onto stops 41ª.

Modifications of the invention may be resorted to without departing from the spirit thereof or the scope of the appended claims.

What is claimed is:

1. Apparatus for finishing tires of large section comprising means for receiving and supporting a tire carcass, including a roller engaging the inner surface of the carcass and a plurality of rollers to engage the outer surface of the tire movable toward and from the first roller, said rollers being journaled on a spindle having portions arranged at angles to each other so as generally to follow the contour of a side of the tire.

2. Apparatus for finishing tires comprising a plurality of means for receiving and supporting a tire to be circumferentially driven by engagement with a bead thereof at spaced points, said means being relatively movable toward and from each other radially in the central opening of a tire to facilitate mounting of a tire thereon.

3. Apparatus for finishing tires comprising a plurality of means for receiving and supporting a tire to be circumferentially driven by engagement with a bead thereof at spaced points, one of said means including a pair of rollers mounted for movement radially in the central opening of the tire toward and from the other of said means.

4. Apparatus for finishing tires comprising a plurality of means for receiving and supporting a tire to be circumferentially driven by engagement with a bead thereof at spaced points, one of said means including a pivoted arm, and a tire engaging roller carried on the free end of said arm, said arm being mounted to move said roller radially of the tire in the central opening thereof.

5. Apparatus for finishing tires comprising a plurality of means for receiving and supporting a tire to be circumferentially driven by engagement with a bead thereof at spaced points, one of said means including a pair of fixedly journaled rollers, and the other of said means including a pair of rollers movable toward and from the fixedly journaled rollers in the central opening of a tire.

6. Apparatus for finishing tires comprising a plurality of means for receiving and supporting a tire to be circumferentially driven by engagement with a bead thereof at spaced points, one of said means including a pair of rollers, one engaging under the bead and another engaging the inner periphery thereof and the other of said means including two pairs of rollers, one of each of which engages under the bead and the other of each of which engages the inner periphery of the bead, the second means being relatively movable toward and from the first means, and stitching devices operable on a tire driven on said means.

EDWARD D. PUTT.